United States Patent [19]

Winterhoff

[11] 4,414,856
[45] Nov. 15, 1983

[54] METHOD AND APPARATUS FOR MEASURING STATIC AND DYNAMIC TORQUES IN A CONTACT FREE MANNER

[75] Inventor: Horst Winterhoff, Dreieich-Buchschlag, Fed. Rep. of Germany

[73] Assignee: Licentia Patent-Verwaltungs-GmbH, Fed. Rep. of Germany

[21] Appl. No.: 295,500

[22] Filed: Aug. 24, 1981

[30] Foreign Application Priority Data

Aug. 25, 1980 [DE] Fed. Rep. of Germany ....... 3031997

[51] Int. Cl.³ .............................................. G01L 1/12
[52] U.S. Cl. .................................. 73/862.36; 73/779; 324/209
[58] Field of Search .............. 73/DIG. 2, 862.36, 779, 73/862.69; 324/209

[56] References Cited

U.S. PATENT DOCUMENTS

| | | | |
|---|---|---|---|
| 2,370,845 | 3/1945 | Davis | 73/DIG. 2 |
| 2,553,833 | 5/1951 | Rifenbergh | 73/862.36 |
| 2,557,393 | 6/1951 | Rifenbergh | 73/862.36 |
| 3,866,462 | 2/1975 | Fraudin | 73/DIG. 2 |

FOREIGN PATENT DOCUMENTS 1160124 7/1969 United Kingdom .................. 73/779

OTHER PUBLICATIONS

O. Dahle, *A.S.E.A. Journal,* vol. 33, No. 3, 1960, pp. 23–32.

*Primary Examiner*—Charles A. Ruehl
*Attorney, Agent, or Firm*—McGlew and Tuttle

[57] ABSTRACT

A method and apparatus for measuring static or dynamic torques on a test piece, in a contact free manner is possible where the test piece is made of magnetically permeable material which permeability changes due to the occurrence of torques on the test piece. These changes are sensed by the apparatus of the invention, according to the method of the invention, utilizing a four pole test probe forming a magnetic bridge.

3 Claims, 4 Drawing Figures

METHOD AND APPARATUS FOR MEASURING STATIC AND DYNAMIC TORQUES IN A CONTACT FREE MANNER

FIELD AND BACKGROUND OF THE INVENTION

The present invention relates to a method and apparatus for measuring static and dynamic torques in a contact-free manner.

Torque pickups are known which use wire strain gauges, requiring a special cylindrical measuring body or shaft which is subjected to torsion by the occurring torque and on which the strain gauges are placed to extend at an angle of 45° to the longitudinal direction. Slip rings are needed for supplying the strain gauges and for collecting the test signals. The measured shaft and the gauge are surrounded by a housing having bearings for the measured shaft. It is further known to supply the voltage for the strain gauges in their measuring position, by transformation, while the test signals are removed in a capacitative way. The costs of the electric equipment are considerable. See for example Handbuch der Industriellen Messtechnik, Vulkan Verlag 1974 (Manual of Industrial Measuring Technique, Publisher Vulcan Verlag 1974.

Inductive torque pickups are also known which comprise a special torsion stick having plunger-type armatures mounted on both its ends, which are displaced in associated coils upon a twisting of the torsion stick connected to the test piece, and which form a bridge circuit. The coils are supplied and their test signals are transmitted without a slip ring (see reference cited above).

Finally, magneto-elastic torque pickups are known which comprise three electromagnetic polar rings carrying windings and surrounding a shaft, with the intermediate winding being supplied with an AC current, and the windings on the two outer polar rings being secondary windings connected in opposition. The measured variable is the position of the zero equipotential line of the magnetic alternating field produced by the intermediate polar ring on the shaft surface. Upon the occurrence of a torque, the permeability and thus also the zero equipotential line changes so that a magnetic potential difference sets up and different voltages are induced in the secondary windings. These torque pickups do use the permeability variations for the measurement, however, the shaft must be surrounded by specially designed polar rings carrying windings (see reference cited above).

SUMMARY OF THE INVENTION

PROBLEM TO BE SOLVED

The invention is directed to a method of measuring a torque on the basis of permeability variations, requiring neither special measuring shafts nor measuring elements surrounding the shaft.

SOLUTION

An object of the present invention is to provide a method for measuring static and dynamic torque, in a contact free manner, utilizing alternating magnetic fields produced in the surface of a piece to be tested which piece is made of magnetically permeable material, with permeability which varies due to an occurrence of torque in the test piece, comprising the steps of sensing the variations in permeability using a test probe having four polar pieces disposed in opposite pairs and having faces facing the test piece, the probes each having windings which are formed into a magnetic bridge and connected to a magnetic bridge circuit, and subjecting the test piece to magnetic saturation.

Another object of the invention is to provide such a method wherein the probe includes a central polar core piece having an excitation winding, and providing measuring windings around the four polar pieces.

A still further object of the invention is to provide such a method including the excitation of the two pairs of windings about the four polar pieces.

Another object of the invention is to provide an apparatus for achieving the foregoing methods.

A still further object is to provide such an apparatus which is simple in design, rugged in construction and economical to manufacture.

ADVANTAGES

A particular advantage is that the invention makes it possible to take measurements directly on the machine parts (shafts), without requiring special shafts or measuring means surrounding the machine part. A very low-resistance system with a low output impedance is provided. The induced measuring voltages are on the order of magnitude of 100 millivolt which results in an inexpensive processing of the signals and control of the indication. The measuring heads in the shape of probes may be very small in size, for example, have a diameter of about 20 mm, and they can simply be placed opposite the test piece.

The various features of novelty which caracterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENT

Figure 1:
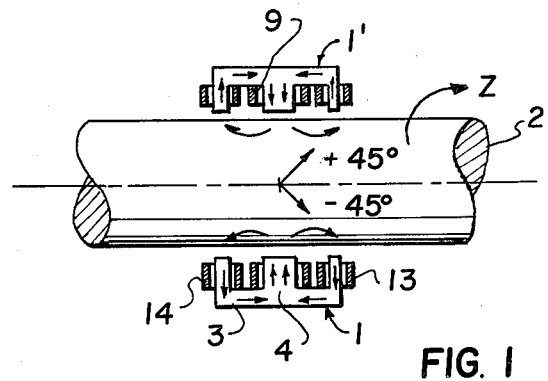
FIG. 1 is a side sectional view, with a test piece shown in elevation, of the apparatus of the invention for carrying out the inventive method.

Turning to the drawings in particular, the invention embodied therein, in FIG. 1 is a method and apparatus for measuring the static and/or dynamic torque on a test piece, for example a shaft 2, utilizing one or more probe heads which sense variations in magnetic permeability of the test piece.

As shown in FIG. 1, two measuring heads 1, 1' are placed very close to a shaft 2, at opposite locations around the shaft. Each measuring head comprises a magnetically soft shell-like core 3 comprising an inside or central core portion 4 and four yoke segments 5, 6, 7 and 8.

Inside core portion 4 is provided with an excitation winding 9 which is supplied from an AC source 10 of suitable frequency (for example 10 KHz to 100 KHz). Segments 5,6 and 7,8 carry measuring winding 11,12 and 13,14 which are series connected in such a way that opposite windings are wound in the same direction as indicated by arrows, with windings 11,12 being connected in opposition to windings 13,14. The ends A and E, and junction M of windings 11,12 and 13,14 are applied to an electrical balancing circuit comprising resistors 15,16,17 and connected to the input of an amplifier 18 controlling an indicator or recorder 20 through a phase selective rectifier 19.

As soon as excitation winding 9 is energized with an AC current from source 10, eddy currents are induced in the surface of shaft 2 facing measuring heads 1,1'. As indicated by arrows in FIG. 1, the lines of magnetic force lead from inside core 4 through the surface of shaft 2, core segments 5 through 8, and back to inside core 4.

Windings 11,12 with yoke segments 5,6 and windings 13,14 with yoke segments 7,8 form two measuring systems which are perpendicular to each other and substantially represent a measuring bridge arrangement.

The eddy currents induced in the surface of shaft 2 limit the path of the lines of force to a certain depth of penetration into the shaft surface.

When shaft 2 is exposed to a torque acting in the direction of arrow Z, and thus subjected to torsion, tensile and compressive strains occur at angles plus and minus 45° relative to the axial direction, which result in a variation of the permeability in the surface of shaft 2. In the direction of the tensile strain (plus 45°) the permeability increases and in the direction of compressive strain, the permeability correspondingly decreases. Due to the increased permeability in the direction of the tensile strain (plus 45°), a voltage is induced in measuring windings 11,12 which is higher than the voltage induced in measuring windings 13,14 which are associated with the compressive strain (minus 45°).

Since windings 11,12 and 13,14 are connected in opposition, a differential voltage appears at ends A and E of the two winding systems, which is directly proportional to the acting torque.

In order to take into account a possible asymmetry of the shell-type core, for example unequal dimensions of the yoke segments, the electrical balancing circuit is provided with the resistors 15 to 17. The measuring voltages supplied by measuring windings 11,12 and 13,14 of the two systems to terminals of ME and MA can be equilibrated by means of variable resistor 17.

A single measuring head is sufficient for determining the torque. If two measuring heads are employed, as shown in FIG. 1, an eccentric or wobbling shaft will not affect the indication since the larger spacing from one measuring head will be correspondingly compensated by the smaller spacing to the other measuring head, i.e. the measurement will be independent of the varying distance. The same applies to bending strains which may occur.

If now the signal voltage is plotted as a function of the torque on an X-Y recorder, for example, and the torque increases or decreases continuously, the plotting is affected by a hysteresis error. This effect can be remedied by selecting for winding 9 an excitation amplitude which is sufficiently high to magnetize shaft 2 up to the saturation region, whereby the hysteresis is eliminated and the lines plotted by recorder 20 will coincide for both an increasing and decreasing torque. Instead of using a correspondingly high excitation amplitude, the shaft may be magnetized up to the saturation region also with another frequency, while employing the same excitation winding.

Even a separate AC current-supplied cylindrical winding may be provided on shaft 2 near measuring heads 1,1' with the magnetic alternating field of this winding being effective as a stray flux causing a magnetization of the shaft up to the saturation region at the location of the measuring probe.

Figure 2:
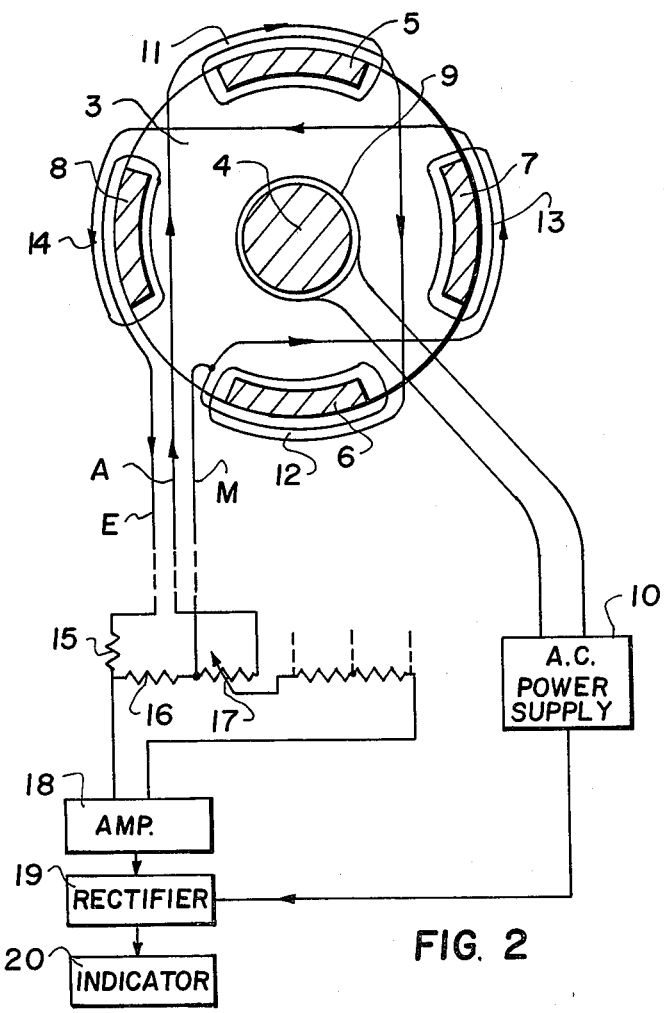
FIG. 2 is an enlarged sectional view of one of the two probes used in accordance with the invention connected to a representative circuit shown in block form.
Figure 3:
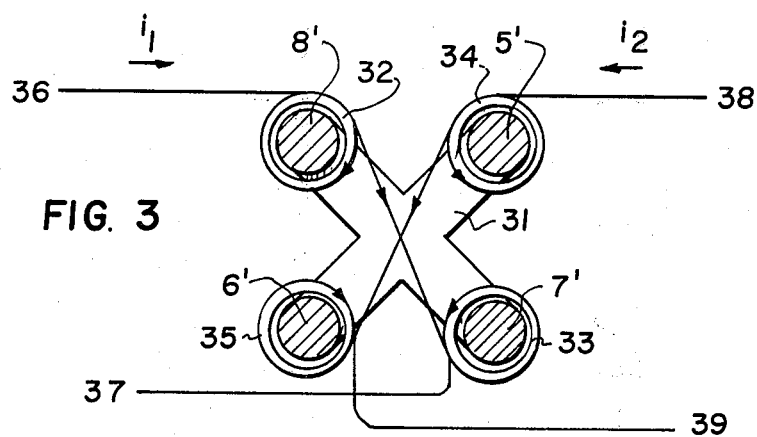
FIG. 3 is a view similar to FIG. 1 of an alternate embodiment for the test head.

In the measuring head according to FIG. 3, an X-shaped ferrite core 31 is provided having again four polar pieces 5' to 8', but no central polar piece. In the same manner as in FIG. 2, two pairs of windings 32,33 and 34,35 are provided which are effective as both measuring and excitation windings.

Figure 4:
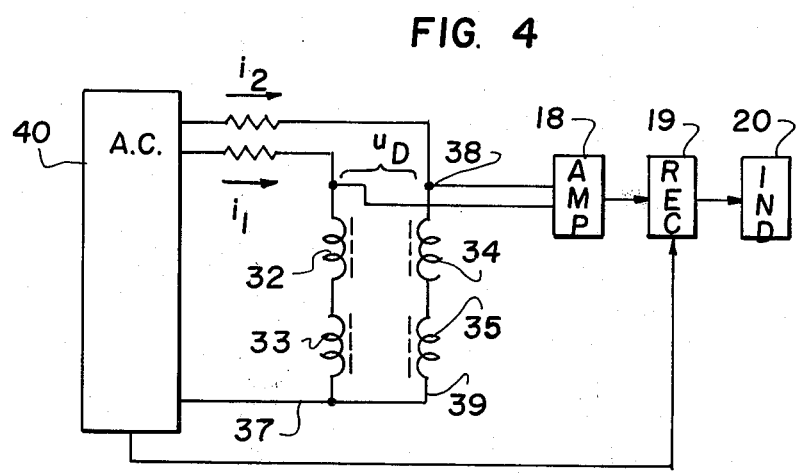
FIG. 4 is a block diagram of a circuit used in accordance with the embodiment of FIG. 3.

As shown in FIG. 4, an AC source 40 is provided supplying two constant and equal currents $i_1$, $i_2$ to the two pairs of windings 32,33 and 34,35. Ends 37,39 of the windings are both connected to a single terminal of source 40 while ends 36,38 are connected to separate terminals of source 40.

Two equal and constant AC currents $i_1$, $i_2$ flow through winding pairs 32,33 and 34,35, respectively. The permeability variations caused in a shaft by a torque acting therein effect corresponding variations of the inductances and impedances, of windings 32,33 and 34,35 and, consequently, produce different voltages thereacross. The differential voltage $U_D$ appearing at ends 36,38 is a measure of the torque.

While specific embodiments of the invention have been shown and described in detail to illustrate the application of the principles of the invention, it will be understood that the invention may be embodied otherwise without departing from such principles.

What is claimed is:

1. A method of measuring torque on a magnetically permeable test piece, in a contact-free manner, with permeability variations in the test piece caused by an occurring torque comprising:
   providing at least one test head adjacent a surface of the test piece, which test head has four mutually spaced pole portions and a substantially central pole portion, all facing and close to the test piece surface, the four spaced pole portions each being in the shape of a ring segment of a common ring which ring is divided into the four spaced pole portions by four slots, the head having a common core to which each of the four spaced and central pole portions is connected, a magnetic winding bridge on the four spaced pole portions, and an excitation winding on the central pole portion;
   energizing the magnetic winding bridge by applying an alternating current to the excitation winding to produce an alternating magnetic field in the test piece surface, with sufficient alternating current being applied to substantially magnetically saturate the test piece surface; and
   measuring the change in the magnetic permeability of the test piece surface, which corresponds to a torque on the test piece, using the magnetic winding bridge.

2. An apparatus for the contact-free measurement of torque on a magnetically permeable test piece, which permeability changes with torque applied to the test piece, comprising:

at least one test head having a magnetic core with four mutually spaced pole portions adapted to be positioned close to a surface of the test piece, each pole portion being in the shape of a ring segment of a common ring, which ring is divided into the four spaced pole portions by four slots;

a winding on each of said pole portions defining a magnetic bridge adapted to sense magnetic permeabiity changes in the test piece surface, said magnetic bridge including a separate winding on each of said mutually spaced pole portions with opposite pole portions carrying windings which are connected to each other in series and wound in the same direction;

a substantially central pole portion connected to said magnetic core;

an excitation winding on said central pole portion;

a source of alternating current connected to said excitation winding; and a magnetic permeability circuit portion having three contacts, two of said contacts each connected to a respective pair of said series connected windings and a remaining one of said contacts connected to both pairs of said series connected windings;

said source establishing an alternating magnetic field in the test piece surface to the point of magnetic saturation thereof, and said circuit portion connected to said magnetic bridge for sensing permeability changes in the test piece surface.

3. Apparatus according to claim 2, wherein each of said windings is connected in series.

* * * * *